United States Patent
Opalka et al.

(10) Patent No.: US 10,329,508 B2
(45) Date of Patent: Jun. 25, 2019

(54) FUEL ADDITIVE AND METHOD OF PREPARING THE SAME

(71) Applicant: Hamilton Sundstrand Corporation, Charlotte, NC (US)

(72) Inventors: Susanne M. Opalka, Glastonbury, CT (US); Haralambos Cordatos, Colchester, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 816 days.

(21) Appl. No.: 14/340,640

(22) Filed: Jul. 25, 2014

(65) Prior Publication Data

US 2016/0024410 A1    Jan. 28, 2016

(51) Int. Cl.
| | |
|---|---|
| *B01J 20/18* | (2006.01) |
| *B01J 29/06* | (2006.01) |
| *C10L 10/04* | (2006.01) |
| *B01J 29/85* | (2006.01) |
| *B01J 29/03* | (2006.01) |
| *B01J 35/10* | (2006.01) |
| *B01J 20/28* | (2006.01) |
| *B01J 20/06* | (2006.01) |
| *B01J 29/82* | (2006.01) |
| *B01J 35/02* | (2006.01) |
| *B01J 35/04* | (2006.01) |
| *B01J 37/10* | (2006.01) |
| *B64D 37/34* | (2006.01) |
| *C10G 25/03* | (2006.01) |

(52) U.S. Cl.
CPC ............... *C10L 10/04* (2013.01); *B01J 20/06* (2013.01); *B01J 20/18* (2013.01); *B01J 20/186* (2013.01); *B01J 20/2808* (2013.01); *B01J 20/28083* (2013.01); *B01J 20/28092* (2013.01); *B01J 29/0308* (2013.01); *B01J 29/06* (2013.01); *B01J 29/061* (2013.01); *B01J 29/82* (2013.01); *B01J 29/85* (2013.01); *B01J 35/026* (2013.01); *B01J 35/04* (2013.01); *B01J 35/109* (2013.01); *B01J 35/1085* (2013.01); *B01J 37/10* (2013.01); *B64D 37/34* (2013.01); *C10G 25/03* (2013.01); *B01J 2229/18* (2013.01); *C10L 2200/0209* (2013.01); *C10L 2200/043* (2013.01); *C10L 2230/02* (2013.01); *C10L 2270/04* (2013.01); *C10L 2290/542* (2013.01)

(58) Field of Classification Search
CPC . B01J 29/82; B01J 29/061; B01J 29/06; B01J 29/85; B01J 29/0308; B01J 2229/18; B01J 37/10; B01J 35/04; B01J 35/026; B01J 35/1085; B01J 35/109; B01J 20/18; B01J 20/186; B01J 20/06; B01J 20/28083; B01J 20/28092; C10G 25/03; B64D 37/34; C10L 10/04; C10L 2270/04; C10L 2230/02; C10L 2200/043; C10L 2290/542

USPC .................................. 502/60, 400, 407, 414
See application file for complete search history.

(56) References Cited

U.S. PATENT DOCUMENTS

| | | | |
|---|---|---|---|
| 3,264,059 A | 8/1966 | McDaniel et al. | |
| 5,672,556 A | * 9/1997 | Pinnavaia | ............... B01J 21/04 423/277 |
| 6,315,815 B1 | 11/2001 | Spadaccini et al. | |
| 6,719,492 B1 | 4/2004 | Heierli | |
| 7,413,818 B2 | 8/2008 | Tsuboyama et al. | |
| 7,465,335 B2 | 12/2008 | Schmidt | |
| 7,615,104 B2 | 11/2009 | Cordatos et al. | |
| 7,744,827 B2 | 6/2010 | Vanderspurt et al. | |
| 8,070,859 B2 | 12/2011 | Ma et al. | |
| 8,147,600 B2 | 4/2012 | Herring et al. | |
| 8,177,884 B2 | 5/2012 | Schmidt et al. | |
| 2010/0092383 A1* | 4/2010 | Ying | ........................ B01J 20/18 423/718 |
| 2012/0004332 A1* | 1/2012 | Yilmaz | .................. B01J 29/049 521/50 |
| 2012/0024776 A1* | 2/2012 | Garcia-Martinez | ...... B01J 20/18 210/500.25 |
| 2013/0004398 A1* | 1/2013 | Grossschmidt | .... B01D 53/9427 423/239.2 |

OTHER PUBLICATIONS

Zeolite article, Basic Aspects of Membrane Supported Catalysts Engineering, Zeolite layers section 1.11.6.7, 2010.*
Jha et al. Fly Ash Zeolites, Basics of Zeolites, Chapter 2, 2016.*
Sachtler, "metal clusters in zeolites: An intriguing Class of Catalysts", Acc. Chem. Res. 1993, 26, 383-387.*
Extended European Search Report Patent Application No. 15178133.3-1361 dated Jan. 7, 2016.
Kei Inumaru et al: "Water-Tolerant, Highly Active Solid Acid Catalysts composed of the Keggin-Type Polyoxometalate H3PW12O40 Immobilized in Hydrophobic Nanospaces of Organomodified Mesoporous Silica." Angewandte Chemie International Edition, vol. 46, No. 40, Aug. 31, 2007 (Aug. 31, 2007), pp. 7625-7628, p. 7625, right-hand column; figure 1. Section: "Experimental Section"; p. 7627, left-hand column-right-hand column.

(Continued)

*Primary Examiner* — Elizabeth D Wood
(74) *Attorney, Agent, or Firm* — Locke Lord LLP; Scott D. Wofsy; Nicholas J. DiCeglie, Jr.

(57) ABSTRACT

Disclosed is a fuel additive which may remove varnish precursor species in a jet fuel. In particular, the fuel additive may be a multi-functional adsorbent which includes a 2-dimensional or 3-dimensional interconnected mesoporous or mixed micro-/mesoporous framework and a plurality of internal cavities formed in the mesoporous or mixed micro-/mesoporous framework and the internal cavities include charged sites to accommodate fuel contaminants for varnish formation, such as metal ions and heteroatomic contaminants. In addition, methods of preparing the multi-functional adsorbent and methods for removing varnish precursor species with the fuel additive are provided.

13 Claims, 4 Drawing Sheets

(56) References Cited

OTHER PUBLICATIONS

Mukai et al: "Preparation of encaged heteropoly acid catalyst by sunthesizing 12-molybdophosphoric acid in the supercages of Y-type zeolite", Applied Catalysis A: General, Elsevier Science, Amsterdam, NL, vol. 165 No. 1-2, Dec. 31, 1997 (Dec. 31, 1991), pp. 219-226.
Dhanajay B. Puranik et al.: "Copper Removal from fuel by Solid-Supported Polyamine chelating Agents", Energy & Fuels., vol. 12, No. 4, Jul. 1, 1998 (Jul. 1, 1998), pp. 792-797, XP055237571, Washington, DC, US.
European Communication Pursuant to Article 94(3) EPC, dated Nov. 28, 2018, issued during the prosecution of European Patent Application No. EP 15178133.3, 6 pages.

* cited by examiner

A hydrocarbon radical is formed at elevated temperature

↓

<u>Dissolved oxygen</u> reacts with the radical forming a peroxy radical

Reactions with S-containing species form low MW polar compounds *(insoluble in fuel)*

Metals (e.g. Cu) *assist* the decomposition:
ROOH + M → RO· + ·OH + M

Formation of high MW *(insoluble in fuel)* compounds by polymerization

R: Hydrocarbon

ROOH: Hydroperoxide

AH: Antioxidant

FIG. 1.

R= Alkyl group

Copper (II) di-naphthenate

FUEL ADDITIVE AND METHOD OF PREPARING THE SAME

TECHNICAL FIELD

The present invention provides a fuel additive which may remove fuel varnish precursor species, methods of preparing the fuel additive, and methods for removing varnish precursor species with the fuel additive.

BACKGROUND

Modern jet engines often operate under elevated heat loads. Under such extreme conditions, varnish, or carbonaceous deposits, may be formed from the oxygenation and polymerization reactions of hydrocarbons in jet fuel, aviation turbine fuel, or kerosene fuel.

Figure 1:
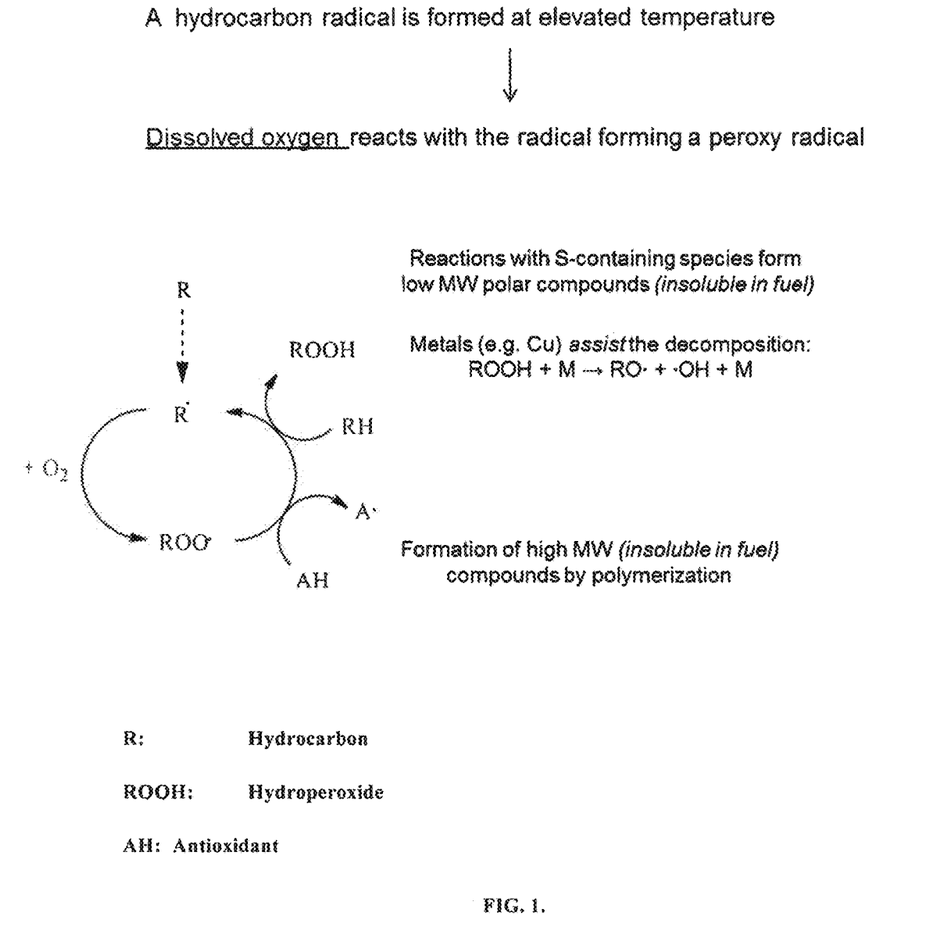
FIG. 1 schematically shows an exemplary chemical chain reaction which may occur in a jet fuel under highly elevated heat load. Each reaction cycle can produce hydrocarbon hydroperoxides and radicals which contribute to varnish formation.

Jet fuel generally includes hydrocarbons as the main component. As shown in FIG. 1, under an elevated heat load in the fuel system, the hydrocarbon molecule R may be activated to form a radical R., after removal of H. by another radical or oxidant initiator. Subsequently, radical R. may be subjected to attack by oxygen gas or dissolved oxygen ($O_2$) to form a peroxy radical, ROO., and may further form a hydroperoxide ROOH by taking a hydrogen radical from another hydrocarbon molecule R', thereby initiating a chain reaction. Hydroperoxides are the primary product in this "autoxidation" process at moderate temperatures (<250° F.) but they further decompose at higher temperatures to propagate fuel autoxidation mechanisms. Varnish products occur when the fuel radicals R. react and polymerize, thereby forming insoluble large molecular weight species which precipitate to form a condensed varnish film or deposit. The radical or undercoordinated species on the outside of this film can react with incoming radicals to further build the film.

Varnish typically causes clogging in aircraft fuel system components, such as actuators, valves, filters, and bearings, and significantly degrades the performance of the fuel system. Generally, the removal of dissolved oxygen from the fuel using a fuel stabilization unit (FSU) is necessary for suppressing varnish formation in jet engine systems (U.S. Pat. Nos. 6,315,815; 6,719,492; 7,615,104; 8,177,884; 7,413,818, 7,744,827). Accordingly, various FSUs to remove dissolved oxygen have been developed. For example, a FSU membrane has been reported to effectively remove the dissolved oxygen (U.S. Pat. Nos. 7,465,335; 8,070,859). Alternatively, the FSU may comprise an electrochemical or physical device to remove dissolved oxygen (U.S. Pat. Nos. 8,147,600; 8,177,884).

It is anticipated that, in the near future, advanced jet turbine engines will require substantial increases in fuel heat loads in order to operate with high efficiency, which will accelerate varnish formation. As such, the removal of dissolved oxygen alone may not be sufficient and advanced FSU may further require removal of chemical precursors which promote varnish formation.

Figure 2:
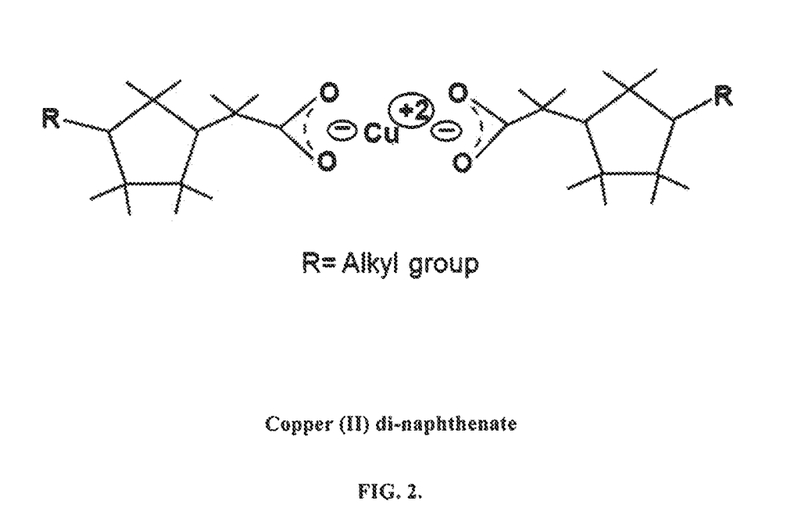
FIG. 2 shows an exemplary metal-heteroatomic ligand complex which may exist in jet fuel according to an exemplary embodiment of the present invention. Provided is a Cu(II) di-naphthenate complex.
Figure 3:
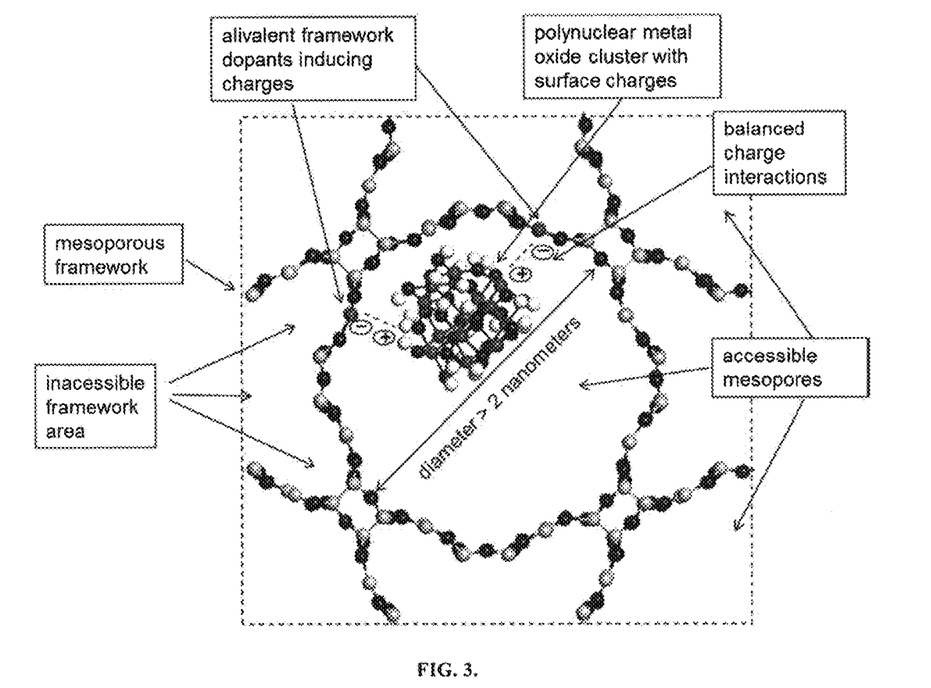
FIG. 3 schematically shows an exemplary multi-functional mesoporous adsorbent according to an exemplary embodiment of the present invention. In this view, the guest polynuclear cluster is shown without any waters and counter-ions for ease of visualization.
Figure 4:
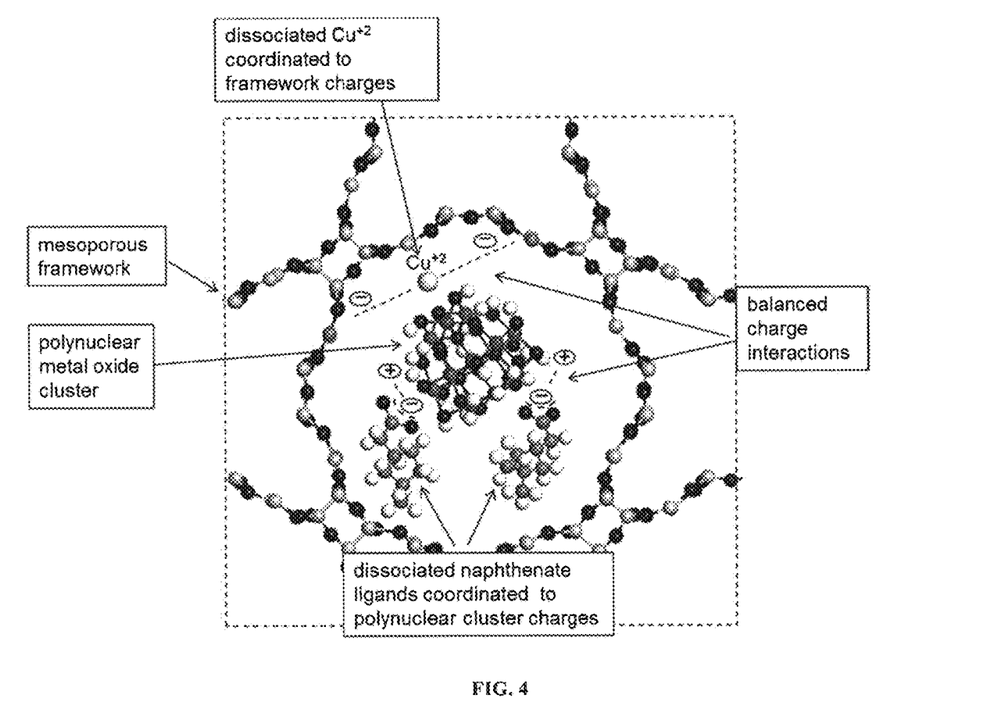
FIG. 4 schematically shows an example of dissociated Cu (II) di-naphthenate adsorbed in multi-functional mesoporous adsorbent according to an exemplary embodiment of the present invention. In this view, the guest polynuclear cluster is shown without any waters and counter-ions for ease of visualization.

Moreover, other fuel contaminants may include metals and heteroatomic organic ligands, for example, copper (Cu) and naphthenic acid. Among other contaminants, the heteroatomic ligands or contaminants mostly originate from the crude oil source feed from which the jet fuel is refined. However, since the heteroatomic contaminants have substantially close boiling fractions to the kerosene-type species in the jet fuel, the undesired heteroatomic contaminants remain in jet fuel even after the refining process. For example, naphthenic acids, cycloalkanes with carboxylic acid functional groups and alkyl side groups, are some of the most deleterious fuel contaminants for varnish formation. The heteroatomic species can react with metals, such as Cu, zinc (Zn), and iron (Fe), to form metal-ligand complexes which are soluble in the jet fuel, like the dissolution of Cu by naphthenic acids to form Cu(II) di-naphthenate (FIG. 2). Such metal-ligand complexes may act as catalysts and/or co-reactants that decompose saturated hydrocarbon components in the jet fuel, facilitate fuel peroxide formation, and hydroperoxide breakdown leading to radical formation. As described above, the radicals promote fuel autoxidation and polymerization, leading to varnish formation. Particularly, at elevated heat loads, e.g. at temperatures of about 250° F. and higher, such autoxidation and polymerization reactions may be greatly accelerated. Therefore, the removal of the heteroatomic contaminants in the fuel or fuel system may be critical for the performance and maintenance of advanced aircraft engines and fuel systems.

As such, there is a need for developing a method or a device to remove fuel contaminants in jet fuel that are precursors for varnish formation.

The description provided above as a related art of the present invention is just for helping understanding the background of the present invention and should not be construed as being included in the related art known by those skilled in the art.

SUMMARY OF THE INVENTION

The present invention provides technical solutions to the technical difficulties described above. Accordingly, a novel fuel additive for removing fuel varnish precursor species, methods of preparing the fuel additive and methods for removing varnish precursor species with the fuel additive are provided in the present invention. Particularly, the fuel additive may include a multi-functional adsorbent or phase-transfer catalyst to remove varnish precursor species from jet fuels.

In one aspect, the present invention provides a multi-functional adsorbent for jet fuel to remove fuel varnish precursor species.

In an exemplary embodiment, the multi-functional adsorbent comprises: a 2-dimensional or 3-dimensional interconnected mesoporous or mixed micro-/mesoporous framework; and a plurality of internal cavities formed in the mesoporous or mixed micro-/mesoporous framework. Particularly, the multi-functional adsorbent has internal cavities with polar charged sites and the outer surface of the framework crystallite or aggregate may be non-polar and hydrophobic.

In certain embodiments, the framework may be a mesoporous or a mixed micro-/mesoporous framework. The mesoporous or mixed micro-/mesoporous framework may be formed of a zeolite, aluminophosphate, hydrotalcite, silicate clay, alumina, transition metal oxides, doped variations thereof, or combinations thereof. In certain embodiments, the size of the cavities in the mesoporous or mixed micro-/mesoporous framework may be up to about 5 nm, of about 0.3 nm to about 4 nm, of about 0.5 nm to about 3 nm, or particularly of about 1 nm to about 2 nm, about without limitation.

In certain embodiments, the framework contains internal cavities with charged sites that are positively charged sites, negatively charged sites, or combinations thereof. In an exemplary embodiment, silica framework negatively charged sites may be formed by Si substitution with Al, B, Ga and combinations thereof. A positively charged site may be formed in a silica framework by Si atom substitution with P, Bi, and combinations thereof.

In certain embodiments, the charged sites of internal cavities of mesoporous or mixed micro-/mesoporous framework of the multi-functional adsorbent may host a charged polynuclear metal oxide/hydroxide cluster. The polynuclear guest species may contain positively charged sites, negatively charged sites, or combinations thereof. The charged sites in the internal cavities of the mesoporous or mixed micro-/mesoporous framework of the multi-functional adsorbent may coordinate and be charge-balanced with charged counter-ion or polynuclear cluster guest species.

In an exemplary embodiment, the positively charged guest sites may be formed by $Al_{13}$ cluster, $\{[Al_{13}O_4(OH)_{24}(H_2O)_{12}]^{7+}.nCl^-\}^{(7-n-)+}$, and negatively charge guest sites may be formed by polyoxometalates $\{[X^{+m}M_{12}O_{40}]^{(8-n)-}.mH^+\}^{(8-n-m)-}$, wherein X is an optional heteroatom including $P^{5+}$, $Si^{4+}$ or $B^{3+}$ and M is a transition metal atom from groups V-VI. Further, the positively charged sites may be formed by $Al_2(OH)_2^{4+}$, $Al_3(OH)_4^{5+}$, $Fe_2(OH)_2^{4+}$, transition metal oxide/hydroxide clusters, or combinations thereof. In certain embodiments, the internal cavities formed in the mesoporous or mixed micro-/mesoporous framework may contain a templating agent, a structure-directing agent, or a pore filler.

In certain embodiments, the multi-functional adsorbent is in a form of a particle and the size of the particle is in a range from about 0.005 µm to about 100 µm, of about 0.01 to about 50 µm, or particularly of about 0.01 µm to about 10 µm in diameter. Alternatively, the multi-functional adsorbent may be in a form of a cartridge, a monolith, a membrane, a coating, or a film.

In other aspect, a method of preparing a multi-functional adsorbent is provided. In an exemplary embodiment, the method comprises: forming a mesoporous or mixed micro-/mesoporous framework by processing an alkaline solution of metal oxides or alkali metal oxide salts by a hydrothermal reaction, and introducing a charged ionic species in the mesoporous or mixed micro-/mesoporous framework. The hydrothermal reaction may be performed at a temperature in a range from about 100 to about 200° C. and at a pressure of about 15 atm or greater. In yet certain embodiments, the method further comprises synthesizing the mesoporous or mixed micro-/mesoporous framework with templating agents, structure-directing agents, or pore fillers.

In certain embodiments, the method further comprises forming charged ionic species or polynuclear clusters prior to the forming the mesoporous or mixed micro-/mesoporous framework. Charged ionic species or polynuclear clusters may be introduced into the framework cavities by ion exchange, soaking, streaming de-alumination, or combinations thereof.

Furthermore, in another aspect, disclosed is a fuel additive which comprises multi-functional adsorbent. In addition, a cartridge which comprises the multi-functional adsorbent in a fuel stabilization system for removing varnish precursors in a fuel is disclosed.

Other aspects and embodiments of the invention are discussed infra.

BRIEF DESCRIPTION OF THE DRAWINGS

The above and other features of the present invention will now be described in detail with reference to certain exemplary embodiments thereof illustrated in the accompanying drawings which are given herein below by way of illustration only, and thus are not limitative of the present invention, and wherein.

DETAILED DESCRIPTION

The invention has been described in detail with reference to exemplary embodiments thereof. However, it will be appreciated by those skilled in the art that changes or modifications may be made in these embodiments without departing from the principles and spirit of the invention, the scope of which is defined in the appended claims and their equivalents.

Definition

As used herein, the term "jet fuel" refers to a type of fuel for a gas-turbine engine in an aircraft. The jet fuel generally contains a range of hydrocarbons, which may have different characteristics, such as a number of carbons, molecular weight, decomposition temperatures, and freezing temperatures. In certain embodiments, the jet fuel may be a combustible hydrocarbon liquid fuel and further contain very low amounts of contaminants, such as metals or heteroatomic ligands, as well as dissolved oxygen. In certain embodiments, the jet fuel may be a kerosene fuel, with includes hydrocarbons with carbon numbers typically ranging between C8 and C16. The kerosene fuel is a combustible hydrocarbon liquid and generally contains alkanes, cycloalkanes, aromatic hydrocarbons, such as alkylbenzenes and alkylnaphthalenes (double ring), and olefins.

As used herein, the term "hydrocarbon" refers to an organic compound consisting only of hydrogen and carbon atoms. Representative hydrocarbons may include aromatic hydrocarbons (arenes), aikanes, alkenes, cycloalkanes, alkyne-based compounds and the like. Hydrocarbons may exist in gas phase, liquid phase, or solid phase according to number of carbons or chemical structure.

As used herein, the term "hydrophobic" refers to a physical or chemical property which repels water or polar molecules. In certain embodiments, the hydrophobic environment or medium may include non-polar organic molecules or solvent. In the hydrophobic medium, the polar and ionic molecules may not be stabilized.

As used herein, the term "hydrophilic" refers to a physical or chemical property which favors water or polar molecules.

In certain embodiments, in the hydrophilic environment, polar and ionic molecules may be stabilized by dielectric forces or ionic forces.

As used herein, the term "varnish" refers to a deposit or precipitate. Varnish may be formed from organic or inorganic materials, which is not soluble in a solvent system. In certain embodiments, varnish may be formed in a jet fuel and the varnish in the jet fuel may contain entrained oxygen and metal, in addition to polymerized fuel fragments. Particularly, when the varnish is formed at elevated temperatures, it is also referred as "coke" or "coking".

As used herein, the term "varnish precursor" refers to molecules or contaminants in a jet fuel which may contribute to the formation of a varnish under a highly elevated heat load. The varnish precursor species may form an insoluble complex, or precipitate, thereby producing the varnish. In certain embodiments, the varnish precursors may be, but not limited to, the hydrocarbons and dissolved oxygen. In other certain embodiments, metal ions or heteroatomic ligands may be the varnish precursors when they precipitate and integrate into the varnish film or coke.

As used herein, the term "contaminant" refers to an undesired substance included in a jet fuel, which may cause other reaction or defect in the jet fuel. In certain embodiments, the contaminant may act as a catalyst to promote unwanted chemical reactions, such as radical formation or varnish formation. In yet certain embodiments, the contaminant may exist as a varnish precursor which is implemented in varnish film or coke. In an exemplary embodiment, the contaminant may include metals, dissolved oxygen, other heteroatomic compounds and the like.

As used herein, the term "heteroatomic" is directed to a hydrocarbon chemical compound which includes one or more additional elements that are not carbon or hydrogen. Generally, the heteroatomic compound may contain non-carbon atoms including, but not limited to, nitrogen, oxygen, sulfur, phosphorus, chlorine, bromine, iodine and the like, which replace carbon in the hydrocarbon backbone or form functional groups in the molecular structure. In certain embodiments, the heteroatomic compound may refer to a heteroatomic contaminant in a jet fuel comprising hydrocarbons. The heteroatomic contaminant may also include phenols, peroxides, sulfides, disulfides, and amines.

As used herein, the term "fuel stabilization unit (FSU)" refers to a unit in a fuel system including delivery system and storage system in an aircraft for maintaining the quality of the jet fuel and removing contaminants from the jet fuel. In certain embodiments, the FSU may remove dissolved gases such as dissolved oxygen, or may remove organic or inorganic contaminants in a jet fuel. In other certain embodiments, the FSU may include, but is not limited to, a membrane device, a cartridge, a filter, a floating unit and the like.

As used herein, the term "multi-functional" refers to a property including various active sites or functionalities. In certain embodiments, the multi-functional molecule, adsorbent or catalyst may contain hydrophobic, hydrophilic, polar, non-polar, cationic, anionic, or neutral functional sites.

As used herein, the term "adsorbent" refers to a substance adsorbing other materials or substances. In certain embodiments, the adsorbent may include an internal cavity or pore which captures and sequesters other substances or molecules.

As used herein, the term "microporous framework" refers to a structure of substance which may contain a 2-dimensional or 3-dimensional interconnected mesoporous or mixed micro-/mesoporous framework of internal cavities and pores with diameters less than 2 nanometers. The microporous framework may be open to a medium and be capable of accommodating other compounds or molecules in the internal cavities without limitation. In certain embodiments, the internal cavities of the microporous framework may be, but are not limited to, a pore, a channel, labyrinth or combinations thereof.

As used herein, the term "mesoporous framework" refers to a structure of substance which may contain a 2-dimensional or 3-dimensional interconnected mesoporous or mixed micro-/mesoporous framework of internal cavities and pores with diameters of approximately 2 nanometers or greater. The mesoporous framework may be open to a medium and be capable of accommodating other compounds or molecules in the internal cavities without limitation. In certain embodiments, the internal cavities of the mesoporous framework may be, but not limited to, a pore, a channel, labyrinth or combinations thereof.

As used herein, the term "mixed micro-/mesoporous framework" refers to a combined structure of a mesoporous framework and a microporous framework. In certain embodiments, the mixed micro-/mesoporous framework has a mixture of internal pore channel and cavity dimensions, some with microporous diameters and some with mesoporous diameters.

As used herein, the term "charged site" refers to a position or location having an electronic force, such a negative (−) charged force and positive (+) charged force. The charged site may be generated by an electron, a proton, an ion including cation (+) and anion (−). In certain embodiments, the charged site may be generated by substitution with electrons, protons, and ions. Alternatively, the charged site may be generated by transferred ions.

As used herein, the term "dissociation" refers to a chemical decomposition of complex, such as ionic compound or metal-ligand complex. In certain embodiments, the metal-ligand complex may dissociate into metal cation and anionic ligand by interactions with the ionic forces of other charged chemical species.

As used herein, the term "phase transfer catalyst" refers to a catalytic material to facilitate a phase transfer. In certain embodiments, the phase transfer may occur between hydrophobic phase and polar or hydrophilic phase, particularly for removal of polar heteroatomic species from the fuel.

As used herein, the term "substitution" refers to an isomorphic (or structurally the same) replacement of an atom in a framework lattice or molecular structure with another type of atom. In certain embodiments, a Si atom in a silica framework structure may be substituted with another atom, such as Al, B, Ga, P, Bi and the like.

As used herein, the term "aliovalent" refers to an ion substituent of a different element in a framework or cluster that has a different charge valence than the parent elemental ion for which it is substituted. Since electron valences of atoms are different from one another, certain substitutions may generate a charge. For example, the $Si^{4+}$ ions in a silicalite zeolite framework or structure are effectively neutralized by balanced bonding interactions with surrounding $O^{2-}$ ions. When is the $Si^{4+}$ ions are substituted with $Al^{3+}$, the substituted site will have an unbalanced negative charge on the surrounding $O^{2-}$ ions. When $Si^{4+}$ in a zeolite framework or structure is substituted with $P^{5+}$, the substituted site will have an excess positive charge that is not neutralized by the surrounding $O^{2-}$ ions.

As used herein, the term "cluster" refers to a group or aggregated form of atoms or molecules. The cluster may be formed from metals, ligands, non-metal atoms, molecules, other smaller clusters or combinations thereof. Furthermore, the cluster may be formed by ionic forces, covalent bonds, Van der Waals forces or combinations thereof. The cluster may have alternative characteristics, which may be or may not be derived from the chemical groups forming the cluster. In certain embodiments, the cluster may be formed with a polynuclear, i.e. multiple-nuclear, comprising a metal, non-metal oxide, and the like. In yet certain embodiments, the cluster may provide a positive charge, a negative charge or combinations thereof.

As used herein, the term "polynuclear" cluster refers to a cluster including more than one metal atoms or ions. In certain embodiments, the polynuclear cluster may include a plurality of metal ions, oxygen, hydrogen, and counter-ions or other chelating ligands. According to various exemplary embodiments, the polynuclear clusters may be hydroxylated metal clusters, for example, $Al_2(OH)_2^{4+}$, $Al_3(OH)_4^{5+}$, $Fe_2(OH)_2^{4+}$, Keggin clusters, such as $Al_{13}$ clusters and $\{[Al_{13}O_4(OH)_{24}(H_2O)_{12}]^{7+}.nCl^-\}^{(7-n)+}$, or polyoxometalates $\{[X^{+n}M_{12}O_{40}]^{(8-n)-}.mH^+\}^{(8-n-m)-}$, when X may be an optional central heteroatom such as most $P^{5+}$, $Si^{4+}$, $B^{3+}$ and M may be a transition metal atom from groups V-VI of the periodic table, such as Mo or W.

As used herein, the term "Keggin" refers to a self-assembled and clustered structure made from multiple atoms. In certain embodiments, the Keggin cluster may include elements of groups V-VI of the periodic table, especially molybdenum (Mo) and tungsten (W), oxygen (O), and optionally a central heteroatom such as phosphorus (P), silicon (Si), boron (B), and counter-ions, such as $H^+$, $NH_4^+$, or alkali, to neutralize the cluster charge. Keggin clusters which comprise transition metals with or without the central heteroatom may be negatively-charged and neutralized by interactions with positive counter-ions. In other certain embodiments, the Keggin cluster may be formed of group XIII elements of the periodic table, especially aluminum (Al), bonded to O and H. Keggin clusters which comprise group XIII elements may be positively-charged and may be neutralized by interactions with negative counter-ions.

As used herein, the term "processing" refers to a treating with active action. In certain embodiments, the processing may include a chemical reaction, physical transformation or combinations thereof.

As used herein, the term "templating agent" refers to a material which facilitates a formation of another material either physically or chemically, and thus can act as a structure-directing agent. In certain embodiments, the templating agent may provide a chemical coordination with precursor species to facilitate building a structure or a framework. Alternatively, the templating agent may be a minimal structure or framework that acts as a foundation for the addition of framework building units.

As used herein, the term "ligand" refers to a chemical Molecule that binds to other molecule or ions to form a complex. In certain embodiments, the ligands may contain one or more polar functional groups that can ionize and react with metal, metal oxide, or metal hydroxide species. In other certain embodiments, the ligand is the heteroatomic contaminant dissolved in the fuel, like naphthenic acid, that dissolves and forms complexes with metal ions. In yet certain embodiments, ligands can be used to modify the compatibility or stability of the polynuclear clusters before or after they are incorporated into the mesoporous or mixed micro-/mesoporous framework.

As used herein, the term "guest" refers to a chemical species that is accommodated within the mesoporous or mixed micro-/mesoporous framework. In certain embodiments, the Keggin cluster may be disposed as guests in the internal cavities of the mesoporous or mixed micro-/mesoporous framework and after being exchanged for counter-ions or templating agents that are in the framework structure following synthesis. In other certain embodiments, the framework guests may be templating agents, structure-directing agents, or pore-fillers that remain in the framework following synthesis.

Removal of Varnish Precursors

The present invention provides a technical solution to remove varnish precursors in jet fuel. The varnish precursors in jet fuel may be chemical contaminant species including metals, organic compounds, dissolved gases and the like. Although the dissolved gases such as dissolved oxygen can be effectively removed by conventional fuel stabilization units, for example, a FSU membrane or degassing device, other contaminants still remain in jet fuel and further cause varnish formation under highly elevated heat load in the advanced jet engine and fuel system thereof. Accordingly, the present invention provides a fuel additive which can remove the remaining chemical species such as metal and heteroatomic contaminants.

In one aspect, a fuel additive is provided which can remove varnish precursors in jet fuel. The fuel additive may be a multi-functional adsorbent including a mesoporous or mixed micro-/mesoporous framework with a plurality of internal cavities which host polynuclear metal cluster guests. In particular, the framework internal cavities and their polynuclear guests may include positively charged sites, negatively charged sites, or combinations thereof. The internally charged mesoporous or mixed micro-/mesoporous frameworks and the polynuclear guests may accommodate chemical species, particularly charged contaminants dissolved in the jet fuel.

In an exemplary embodiment, in hydrophobic hydrocarbon jet fuel, the positively charged contaminants may be metal ions and the negatively charged contaminants may be heteroatomic ligands. For example, a Cu (I) or (II) metal ion and naphthenic acid may be dissolved in jet fuel under highly elevated heat load, and form a complex (FIG. 2). When the Cu(I) naphthenate or the Cu(II) di-naphthenate complex engages in the multi-functional adsorbent, the complex may dissociate on charged sites within the framework internal cavities. The dissociation may occur due to ionic forces between a positively charged functional site and a heteroatomic ligand, and between a negatively charged functional site and a metal cation.

The chemical species or contaminants in jet fuel are in a hydrophobic environment, since the jet fuel mainly contains hydrocarbon fuel. When the multi-functional adsorbent interacts with the chemical species, particularly through the internal cavities and their polynuclear guests having charged sites, partitioning of the chemical species may occur between hydrophobic surrounding and polar charged sites in the internal cavities, like the partitioning between non-polar organic solvent layer and polar solvent layer. Accordingly, the chemical species having polarity or ionic charges may be preferably engaged within the internal cavities of the multi-functional adsorbent. In certain embodiments, the multi-functional adsorbent may function as a phase transfer catalyst.

Dissociation of the chemical species, or particularly, of the metal-heteroatomic ligand complex, may occur subsequently in the internal cavities. Dissociation of the chemical species may occur when the ionic bonding between complex metal cation and heteroatomic ligand anion is weaker than their separate respective bonding interactions with oppositely charged functional sites within the internal cavities of the multi-functional adsorbent. When the dissociation of the metal-ligand complex occurs, the ionized chemical species, i.e. metal ion and heteroatomic ligand, may be stabilized, and thus the multi-functional adsorbent may be in a state of "adsorbing" or sequestering the metal and heteroatomic contaminants.

In certain embodiments, the multi-functional adsorbent can adsorb a polar molecule, such as heteroatomic molecules, like naphthenic acid, and water. The internal cavities of the multi-functional adsorbent may provide polarity and interact with polar molecules remaining in hydrocarbon jet fuel, thereby removing polar or ionic contaminants from the hydrocarbon fuel medium.

Method of Preventing Varnish Formation in a Jet Engine Assembly and Removing Varnish Precursors Accordingly, in one aspect, the present invention provides a method of preventing varnish formation in the jet engine assembly. In particular, the method includes removing varnish precursors in the jet fuel by adsorbing the varnish precursors in the jet fuel with the multi-functional adsorbents.

In an exemplary embodiment, the method may include: providing a multi-functional adsorbent; adsorbing varnish precursors in the jet fuel with the multi-functional adsorbent; and removing the multi-functional adsorbent from the jet fuel, thereby removing the varnish precursors.

In an exemplary embodiment, the method may include: providing a multi-functional adsorbent; applying the multi-functional adsorbent in a fuel stabilization unit; adsorbing varnish precursors in the jet fuel with the multi-functional adsorbent; and removing the multi-functional adsorbent from the jet fuel, thereby removing the varnish precursors.

In certain embodiments, the varnish precursors which can be adsorbed by the multi-functional adsorbent may include metal ions, heteroatomic contaminants, ionic contaminants, or polar or hydrophilic molecules.

In certain embodiments, the multi-functional adsorbents may be provided in the jet fuel as a fuel additive. Alternatively, the multi-functional adsorbents may be applied in the aircraft fuel system. In particular, the multi-functional adsorbents may be applied in the fuel stabilization unit and subsequently provided in the fuel stabilization unit of the jet engine assembly.

In certain embodiments, the provided multi-functional adsorbent may be, but not limited to, in a form of a particle, a monolith, a pellet, a granule, a film, or a coating, without limitation.

In certain embodiments, the removal of the multi-functional adsorbent may be, but not limited to, filtering, straining or suspending thereof from the jet fuel in the FSU.

Multi-Functional Adsorbent

The multi-functional adsorbent used in the method of preventing varnish formation in the jet engine assembly and removing varnish precursors according to various exemplary embodiments are disclosed and described further in detail hereafter. Particularly, the multi-functional adsorbent can remove fuel varnish precursor species including contaminant complexes such as a metal ion and a heteroatomic ligand.

In one aspect, the multi-functional adsorbent may include a mesoporous or mixed micro-/mesoporous frameworks and internal cavities. In particular, charged sites may be disposed in the internal cavities to adsorb varnish precursors and the mesoporous or mixed micro-/mesoporous frameworks may provide a polar or ionic environment that is isolated from the hydrophobic hydrocarbon fuel medium. Thus, the multi-functional adsorbent in the hydrocarbon fuel may actively transfer the metal-heteroatomic ligand complex from the hydrophobic medium into the internal cavities in the mesoporous or mixed micro-/mesoporous framework of the multi-functional adsorbent.

In an exemplary embodiment, the multi-functional adsorbent may include a mesoporous or mixed micro-/mesoporous frameworks having a cavity, and a charged site on the internal cavity wall. In particular, the charged site may be an aliovalent ion which is integrated to the mesoporous or mixed micro-/mesoporous framework internal cavity wall.

In certain embodiments, the cavities of the mesoporous or mixed micro-/mesoporous framework may be in a form of but not limited to, a pore, a channel, labyrinth, or combinations thereof. Large cavities may also be formed at pore intersections to accommodate large chemical species such as polynuclear cluster guests, as well as fuel contaminants that adsorb onto the cluster and/or the framework wall.

In certain embodiments, the size of the cavities in the mesoporous framework may be up to about 5 nm, of about 0.3 nm to about 4 nm, of about 0.5 nm to about 3 nm, or particularly of about 1 nm to about 2 nm, about without limitation. In certain exemplary embodiments, the size of each internal pore or cavity of the mixed micro-/mesoporous framework may be in the range from about 0.5 nanometers (nm) to about 2 nm in diameter. In yet certain exemplary embodiments, the diameters of the internal pores range from 0.5 nm to 1.0 nm, and the internal cavities are 1.9 nm or greater in the mixed micro-/mesoporous framework. In another certain exemplary embodiments, the size of each internal pore or cavity of the mesoporous framework may be greater than 2 nm in diameter.

In certain embodiments, the cavities of the mixed micro-/mesoporous framework, contains microporous channels that are large enough to accommodate the shape-selective passage of the fuel contaminant complexes and internal cavities that are large enough to accommodate the polynuclear cluster and reaction products of the cluster with fuel contaminants.

In an exemplary embodiment, the multi-functional adsorbent may have a chemical composition of a zeolite, aluminophosphate, hydrotalcite, silicate clay, alumina, transition metal oxides, their doped variations, or mixtures thereof. In particular, the multi-functional adsorbent may be a zeolite, or aluminosilicate. In certain embodiments, the mesoporous or mixed micro-/mesoporous framework may be formed of, but not limited to, a zeolite, aluminophosphate, hydrotalcite, silicate clay, alumina, transition metal oxides, their doped variations, or mixtures thereof. For example, the zeolite may be used and have internal cavities and pores to accommodate polynuclear charged ionic clusters which may be up to 1.3 nm or more in diameter. The internal cavities may be large or tortuous enough to allow shape-selective passage and retention of polar fuel contaminant species. Alternatively, the internal cavities in the mesoporous or mixed micro-/mesoporous framework may provide the isolated chemical environment, which may promote chemical reactions such as dissociation which promote contaminant adsorption.

In certain embodiments, the multi-functional adsorbent may be in a form of, but not limited to, a particle or a crystalline particle. In addition, multi-functional adsorbent may be a particulate powder, which may comprise aggregates of crystallites, or nano-crystallites. The size of the particles may be in a range of about 0.005 μm to about 100 μm, of about 0.01 to about 50 μm, or particularly of about 0.01 μm to about 10 μm. The size of the particles may improve adsorption and phase transfer rate of the multi-functional adsorbent. For example, when the particle size is reduced, the surface area to bulk ratio may increase accordingly, thereby improving surface adsorption and phase transfer rate for the ingress of fuel heteroatomic contaminants, metal ions, and their complexes into the adsorbent internal framework.

In an exemplary embodiment, the multi-functional adsorbent may have the charged sites which include positively charged sites, negatively charged sites, or combinations thereof. In certain embodiments, the internal cavities of the multi-functional adsorbent may be modified to provide the charged sites by substitution of various substituents, such as $Al^{3+}$, for $Si^{4+}$ in a silicate ($SiO_2$) framework. Particularly, substitution sites may be located internally in the cavities of the framework, and not on the framework outside surfaces. The resulting charge from the dopant substitution depends on the difference in the valence change between the dopant and the original parent atom that it is substituted for. When a lower valence charged species, such as $Al^{+3}$, replaces $Si^{4+}$, a negatively charged site in the internal cavities may be produced because of the subsequent charge imbalance with the surrounding oxygen ions in the mesoporous or mixed micro-/mesoporous frameworks. Alternatively, such substitution in the internal cavities of the multi-functional adsorbent framework may occur with other substituents of Si, which may include B, Ga, Fe, and the like. In yet certain embodiments, the internal cavities of the multi-functional adsorbent may be further modified by substitution of a higher valence charged substituent, such as $P^{5+}$, for $Si^{4+}$, thereby producing positively-charged sites in the internal cavities. Meanwhile, when $Ge^{4+}$ substitutes $Si^{4+}$, the mesoporous or mixed micro-/mesoporous framework thermal stability may be improved without ionic differences.

In certain embodiments, in aluminophosphate frameworks, the internal cavities of the multi-functional adsorbent may be modified to provide the charged sites by substitution of various substituents for $Al^{3+}$ or $P^{5+}$. When a $Al^{+3}$ is replaced with a lower valence charged species such as $Zn^{2+}$ or $Mg^{2+}$, a negatively charged site in the internal cavities may be produced due to the subsequent charge imbalance in the mesoporous or mixed micro-/mesoporous frameworks. Furthermore, a $P^{+5}$ may be replaced with $V^{4+}$ or $Si^{4+}$ to produce a negatively charged site. In yet certain embodiments, the internal cavities of the multi-functional adsorbent may also be modified to provide the charged sites by substitution in a hydrotalcite framework which naturally has anionic sites. In this case, the substitution may be for $Mg^{+2}$ or $Al^{+3}$, and the charge balance may depend on the Mg/Al ratio. For example, substitution of +3 transition metal ions for $Mg^{+2}$ can lead to cationic sites.

The charged sites in the internal cavities of mesoporous or mixed micro-/mesoporous framework of the multi-functional adsorbent may coordinate and be charge balanced with counter-charged ionic guest species. For example, the anionic sites of the $Al^{3+}$ substituted mesoporous or mixed micro-/mesoporous silica framework may be neutralized by charged ionic species, i.e., other cations, in the internal cavities. In certain embodiments, the charged ionic species may be polynuclear species such as hydroxylated metal clusters, for example, $Al_2(OH)_2^{4+}$, $Al_3(OH)_4^{5+}$, $Fe_2(OH)_2^{4+}$. In yet certain embodiments, the charged ionic species may be Keggin clusters, including $Al_{13}$ clusters, $\{[Al_{13}O_4(OH)_{24}(H_2O)_{12}]^{7+}\cdot nCl^-\}^{(7-n)+}$, and polyoxometalates $\{[X^{+n}M_{12}O_{40}]^{(8-n)-}\cdot mH^+\}^{(8-n-m)-}$, wherein X may be an optional central heteroatom such as $P^{5+}$, $Si^{4+}$, $B^{3+}$, and M may be a transition metal atom from groups V-VI of the periodic table, such as Mo or W. The total charges of these polynuclear charged ionic species or Keggin clusters may be adjusted by the appropriate number of charged counter-ions or polar ligands in their outer coordination sphere. The unbalanced charges will influence the configuration and strength of the polynuclear cluster interactions with one or more charged cavity sites in the host framework. In certain embodiments, the polynuclear clusters, especially the $Al_{13}$ clusters, are intercalated in the hydrotalcite or silicate clays, to form a particular structure where the $Al_{13}$ incorporation effectively expands the intercrystalline layer spacing to form channels.

The multi-functional adsorbent may act as a phase transfer catalyst by adsorbing and dissociating metal-ligand complexes. During the phase transfer, a metal-ligand complex may be transferred from hydrophobic medium, i.e. hydrocarbon fuel, to the adsorbent polar or hydrophilic internal cavities. The interactions between the host framework and guest charged sites are long-range and weak, so that their coordination can be disrupted to enable their respective interactions with polar functional groups of fuel contaminants transferred into the framework. Subsequently, direct ionic interactions from charged sites in the cavities of the mesoporous or mixed micro-/mesoporous framework may further facilitate dissociation of metal-ligand complex. For example, an aluminosilicate zeolite adsorbent with Al in its framework hosting $\{[Al_{13}O_4(OH)_{24}(H_2O)_{12}]^{7+}\cdot nCl^-\}^{(7-n)+}$ clusters in its cavity may dissociate Cu naphthenate and adsorb $Cu^+$ or $Cu^{2+}$ on a negatively charged framework oxygen atom adjacent to the $Al^{3+}$ substitution site and the naphthenate ligand(s) on the $\{[Al_{13}O_4(OH)_{24}(H_2O)_{12}]^{7+}\cdot nCl^-\}^{(7-n)+}$ guest cluster in the zeolite cavity.

In certain embodiments, the internal cavities formed in the mesoporous or mixed micro-/mesoporous framework may contain a templating agent, a structure-directing agent, or a pore filler. In particular, the internal cavities may contain, but are not limited to, alkali-organic complexes or quaternary amine cations.

In various exemplary embodiments, the outer surface of the multi-functional adsorbent may be hydrophobic and the multi-functional adsorbent may be mixed or dispersed in the fuel without phase separation. Alternatively, the outer surface of the multi-functional adsorbent may be further modified physically or chemically with ligands to improve dispersibility or for appropriate application, without limitations.

Methods of Preparing the Multi-Functional Adsorbent

The present invention further provides methods of preparing multi-functional adsorbents.

In an exemplary embodiment, a method of preparing the multi-functional adsorbent comprises the steps of: forming the mesoporous or mixed micro-/mesoporous frameworks by processing an alkaline or acidic solution of metal oxides or alkali metal oxide salts by a hydrothermal reaction and preparing the polynuclear clusters. In particular, the mesoporous or mixed micro-/mesoporous frameworks may be formed by hydrothermally processing an alkaline solution of metal oxides or alkali metal oxide salts. Particularly, the hydrothermal reaction is carried out in a sealed autoclave, where the temperature and the pressure thereof may be elevated, to a temperatures ranging from about 100 to about 200° C. and at a pressure of about 15 atm or greater. Templating agents, structure-directing agents, surfactants, anionic copolymers, pore fillers, or metal oxide framework substituent precursors, such as those containing the metals: Al, B, Ga, P, Bi, or Ge, may be used during the framework synthesis to facilitate the formation of stable mesoporous or mixed micro-/mesoporous frameworks. Subsequently, the polynuclear clusters may be prepared by pH-controlled hydrolysis of metal salts.

In an exemplary embodiment, a method of preparing the multi-functional adsorbent comprises the steps of: forming the mesoporous or mixed micro-/mesoporous frameworks by processing an acidified organic solvent solution of sol-gel or salt precursors of alumina, silica, transitional metal oxide, or their mixtures, along with structure-directing agents, surfactants, anionic copolymers, or pore fillers, and preparing the polynuclear clusters. In particular, the mesoporous or mixed micro-/mesoporous frameworks are formed by controlled precipitation or evaporation, rinsing, and drying/calcination at an elevated temperature, above 250° C. Subsequently, the polynuclear clusters may be prepared by pH-controlled hydrolysis of metal salts.

In an exemplary embodiment, the method may further comprise the step of treating the mesoporous or mixed micro-/mesoporous framework to incorporate charged ionic species or polynuclear clusters in the framework cavities. In certain embodiments, the treatment may include, but is not limited to, ion exchange of framework counter-ions remaining from the framework synthesis with the charged polynuclear clusters or their precursors. Alternatively, the treatment may be performed by soaking or refluxing the framework particles in a solution containing the charged polynuclear clusters or their precursors. In certain embodiments, the charged ionic species which encounter the internal cavities of the mesoporous or mixed micro-/mesoporous framework may be introduced by zeolite steaming de-alumination or other treatments.

In an exemplary embodiment, the polynuclear clusters may be formed prior to the reaction for forming the mesoporous or mixed micro-/mesoporous frameworks, in certain embodiments, the polynuclear clusters may be used as templating agents during the mesoporous or mixed micro-/mesoporous framework synthesis. In yet certain embodiments, the polynuclear cluster may be also formed in-situ in the framework during or after the formation of the mesoporous or mixed micro-/mesoporous framework of the multi-functional adsorbent.

Application in Fuel Stabilization Unit

The present invention further provides a device or system for removing metal-heteroatomic contaminant complexes by implementing multi-functional adsorbent in a fuel stabilization unit.

In an exemplary embodiment, the multi-functional adsorbent may be fabricated in two-dimensional or three-dimensional structures. In certain embodiments, the multi-functional adsorbent may be fabricated in two-dimensional films or coatings deposited on fins or baffles directing fuel flow in the central FSU fuel inlet compartment. In certain embodiments the multi-functional adsorbent may be deposited onto two-dimensional films in lieu of membranes in an FSU. In yet certain embodiments, the multi-functional adsorbent may be incorporated into a filter unit that is situated or suspended in the central FSU fuel inlet compartment.

The multi-functional adsorbents in various exemplary embodiments of the present invention may provide a synergistic effect and complementary performance with other FSUs, particularly by removing varnish precursors and preventing varnish deposition. Furthermore, the multi-functional adsorbents may not require substantial space or weight for implementing such applications in an aircraft. In addition, the multi-functional adsorbents may effectively remove other fuel contaminants, such as water, surfactant or peroxide species existing in the fuel, without interfering with other additives. Other aspects of the invention including additional infrastructure or maintenance requirements to implementing the multi-functional adsorbents may be further provided without limitation.

Application in Aircraft Fuel Systems

The present invention further provides a device or system for removing heteroatomic contaminants or metal-heteroatomic contaminant complexes by implementing multi-functional adsorbents in aviation fuel supply terminals or in aircraft fuel systems.

In an exemplary embodiment, the multi-functional adsorbent may be fabricated in two-dimensional or three-dimensional structures. In certain embodiments, the multi-functional adsorbent may be fabricated in two-dimensional films or coatings. In certain embodiments the coating can be applied to the terminal storage tank or the aircraft fuel tank wall. In yet certain embodiments, the multi-functional adsorbent may be, but not limited to, fabricated in nanoparticles, pellets, granules or powder, or a filter unit.

In an exemplary embodiment, the multi-functional adsorbent may be included in a cartridge that is part of the aircraft fuel system. In certain embodiments, the multi-functional adsorbent may be included in a cartridge system in a main or redundant fuel tank. In certain embodiments, the cartridge trap may be disposed in supply terminal or fuel dispensing system as part of a strainer, sump, separator, or filter elements, without limitation.

In an exemplary embodiment, the multi-functional adsorbent may be included in an auxiliary compartment outfitted with pump, filter, strainers, or sumps of the fuel system. The adsorbent in particulate form can be directly suspended in the fuel and removed by a micron-sized fuel filter incorporated into the fuel system line ahead of the fuel pump.

In an exemplary embodiment, the multi-functional adsorbent may be incorporated onto the surface of a filter unit. In certain embodiments, the filter unit may be installed in a main fuel or auxiliary fuel tanks.

The multi-functional adsorbents in various exemplary embodiments of the present invention may provide a synergistic effect and complementary performances with other fuel system components, such as sumps, sediment chambers and traps, strainers, filters, and drains, particularly by removing varnish precursors and preventing varnish deposition. Furthermore, the multi-functional adsorbents may not require substantial space or weight for implementing such applications in an aircraft. In addition, the multi-functional adsorbents may effectively remove other fuel contaminants, such as water, surfactant or peroxide species existing in the fuel, without interfering with other additives. Other aspects of the invention including additional infrastructure or maintenance requirements to implementing the multi-functional adsorbents may be further provided without limitation.

EXAMPLE

The following examples illustrate the invention and are not intended to limit the same.

Example 1

Aluminosilicate zeolite particles are prepared with alkaline solutions of sodium aluminate and sodium silicate salts by high temperature/pressure hydrothermal processing. The obtained zeolite has a particle size of about 10 μm in diameter and has a mixed microporous-mesoporous framework including a plurality of internal cavities. The size of the internal cavities is in the range from about 1-2 nm. The zeolite framework contains concentrated Al substitution sites on the internal framework surrounding the internal cavities. The zeolite is the sodium form of a low or intermediate Si/Al ratio, with a Si/Al ratio from about 1 to about 10, to ensure that those internal cavities such as pores and channels are chemically-selective and charged sites compatible with polar compounds. Particularly, the zeolite has sufficient framework substituent sites in close proximity, i.e clustering, to coordinate with multiply-charged counterions.

The zeolite particles are further treated by soaking or refluxing in a solution containing concentrated $\{[Al_{13}O_4(OH)_{24}(H_2O)_{12}]^{7+}.7Cl^-\}$ polynuclear clusters for about 6 hours. The $\{[Al_{13}O_4(OH)_{24}(H_2O)_{12}]^{7+}.nCl^-\}^{(7-n)+}$ clusters are incorporated into the zeolite cavities in exchange from the Na$^+$ counter-ions remaining from synthesis, forming NaCl salt byproducts from reaction of the exchanged framework Na$^+$ counter-ions with the polynuclear cluster counterions in the solution. The obtained zeolite adsorbent is incorporated in a cartridge or FSU membrane unit and placed in a fuel system.

Example 2

A phosphate silicate zeolite particle is prepared with alkaline solutions of sodium silicate salts, phosphate esters and anionic surfactants by high temperature/pressure hydrothermal processing. The obtained zeolite has a particle size of about 0.1 µm in diameter and has a mixed microporous-mesoporous framework including a plurality of internal cavities. The size of the internal cavities is in the range from about 1-2 nm. The zeolite framework contains concentrated cationic P substitution sites on the internal framework surrounding the internal cavities.

The zeolite particles are further treated by soaking or refluxing in a solution containing concentrated silicomolybdate polyoxometalates $\{[Si^{+4}Mo_{12}O_{40}]^{4-}.4H^+\}$ polynuclear clusters for about 6 hours. The $\{[Si^{+4}Mo_{12}O_{40}]^{4-}.4H^+\}$ clusters are incorporated into the zeolite cavities in exchange with the anionic surfactants that remain from synthesis, where the polyoxometalate proton counter-ions neutralize the anionic surfactant polar functional groups. The resulting negatively charged polyoxometalates interact with the positively charged P ions in the framework cavity wall. The obtained zeolite adsorbent is incorporated in a coating that is applied to the aircraft auxiliary fuel tank.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multi-functional adsorbent for jet fuel, comprising:
a 2-dimensional or 3-dimensional interconnected mesoporous or mixed micro-/mesoporous framework; and
a plurality of internal cavities formed in the mesoporous or mixed micro-/mesoporous framework,
wherein the size of each internal cavity formed in the mesoporous or mixed micro-/mesoporous framework is in a range from about 0.3 nm to about 4 nm;
wherein the internal cavities include positively charged sites, negatively charged sites or combinations thereof;
wherein the mesoporous or mixed micro-/mesoporous framework includes a polynuclear cluster, wherein the polynuclear cluster contains one or more positively charged or negatively charged sites; and
herein the polynuclear cluster is an $Al_{13}$ cluster, $\{[Al_{13}O_4(OH)_{24}(H_2O)_{12}]^{7+}.nCl^-\}^{(7-n)+}$, a polyoxometalate $\{[X^{+n}M_{12}O_{40}]^{(8-n)-}.mH^+\}^{(8-n-m)-}$ or combinations thereof,
wherein X is $P^{5+}$, $Si^{4+}$ or $B^{3+}$ and M is a transition metal atom from groups V-VI.

2. The multi-functional adsorbent of claim 1, wherein the mesoporous or mixed micro-/mesoporous framework is formed of a zeolite, aluminophosphate, hydrotalcite, silicate clay, alumina, transition metal oxides, doped variations thereof, or combinations thereof.

3. The multi-functional adsorbent of claim 1, wherein the polynuclear cluster is $Al_2(OH)_2^{4+}$, $Al_3(OH)_4^{5+}$, $Fe_2(OH)_2^{4+}$, transition metal oxide/hydroxide clusters, or combinations thereof.

4. The multi-functional adsorbent of claim 1, wherein the charged site is formed by framework Si substitution with Al, B, Ga, P, Bi or combinations thereof.

5. The multi-functional adsorbent of claim 1, wherein the charged site is formed by framework Al substitution with Mg, Zn or combinations thereof.

6. The multi-functional adsorbent of claim 1, wherein an outer surface of the multi-functional adsorbent is hydrophobic.

7. The multi-functional adsorbent of claim 1, wherein the internal cavities formed in the mesoporous or mixed micro-/mesoporous framework contains a templating agent, a structure-directing agent, or a pore filler.

8. The multi-functional adsorbent of claim 1, wherein the multi-functional adsorbent is in a form of a particle and a size of the particle is in a range from about 0.005 µm to about 100 µm in diameter.

9. The multi-functional adsorbent of claim 1, wherein the multi-functional adsorbent is in a form of a two-dimensional film, coating or membrane.

10. A cartridge in a fuel stabilization unit of an aircraft for removing varnish precursors in a fuel, comprising the multi-functional adsorbent of claim 1.

11. A coating or film comprising the multi-functional adsorbent of claim 1 deposited on fuel channel surfaces, including flow-directing baffles, in a fuel stabilization system or within the fuel system of an aircraft for removing varnish precursors in a fuel.

12. A cartridge or filter in an aircraft fuel system for removing varnish precursors in a fuel, comprising the multi-functional adsorbent of claim 1.

13. A fuel additive comprising the multi-functional adsorbent of claim 1 in an aircraft fuel system for removing varnish precursors in a fuel.

* * * * *